United States Patent [19]

Sung et al.

[11] Patent Number: 4,968,321

[45] Date of Patent: Nov. 6, 1990

[54] ORI-INHIBITED MOTOR FUEL COMPOSITION

[75] Inventors: Rodney L. Sung, Fishkill; Daniel T. Daly, Brewster; Thomas E. Hayden, Wappingers Falls, all of N.Y.; Rolf Sieverding, Winsen/Luhe, Fed. Rep. of Germany

[73] Assignees: Texaco Inc.; Texaco Technology Europe GmbH, both of White Plains, N.Y.

[21] Appl. No.: 307,018

[22] Filed: Feb. 6, 1989

[51] Int. Cl.$^5$ .............................................. C10L 1/22
[52] U.S. Cl. ....................................... 44/337; 44/331; 44/459; 548/548
[58] Field of Search ........................ 44/63, 62, 71, 72; 564/505; 525/409; 528/421; 548/548

[56] References Cited

U.S. PATENT DOCUMENTS

| | | | |
|---|---|---|---|
| 3,438,757 | 4/1969 | Honnen et al. | 44/63 |
| 3,658,495 | 4/1972 | Dorer, Jr. | 44/63 |
| 3,676,089 | 7/1972 | Morris et al. | 44/63 |
| 3,960,515 | 6/1976 | Honnen | 44/63 |
| 4,098,585 | 7/1978 | Vartanian et al. | 44/63 |
| 4,247,301 | 1/1981 | Honnen | 44/63 |
| 4,326,987 | 4/1982 | Hendricks et al. | 44/63 |
| 4,581,038 | 4/1986 | Hoke | 44/63 |
| 4,581,040 | 4/1986 | Sung et al. | 44/63 |
| 4,631,069 | 12/1986 | Sung | 44/63 |
| 4,643,738 | 2/1987 | Sung et al. | 44/63 |
| 4,659,336 | 4/1987 | Sung et al. | 44/62 |
| 4,659,337 | 4/1987 | Sung | 44/63 |
| 4,747,851 | 5/1988 | Sung et al. | 44/62 |

Primary Examiner—Margaret B. Medley
Attorney, Agent, or Firm—Robert A. Kulason; James J. O'Loughlin

[57] ABSTRACT

A motor fuel composition which inhibits engine ORI and intake valve deposit formation and sticking comprises a mixture of hydrocarbons boiling in the range of 90° F.–450° F. and (I) the reaction product of a hydrocarbyl-substituted dibasic acid anhydride and a polyoxyalkylene diamine; (II) a polymeric component which is a polyolefin polymer, copolymer, or the corresponding aminated or hydrogenated polymer or copolymer, or mixtures thereof, of a $C_2$–$C_{10}$ hydrocarbon; (III) a polyalkylene glycol having a molecular weight in the range of 500–2000; and (IV) a lubricating oil composition.

29 Claims, 1 Drawing Sheet

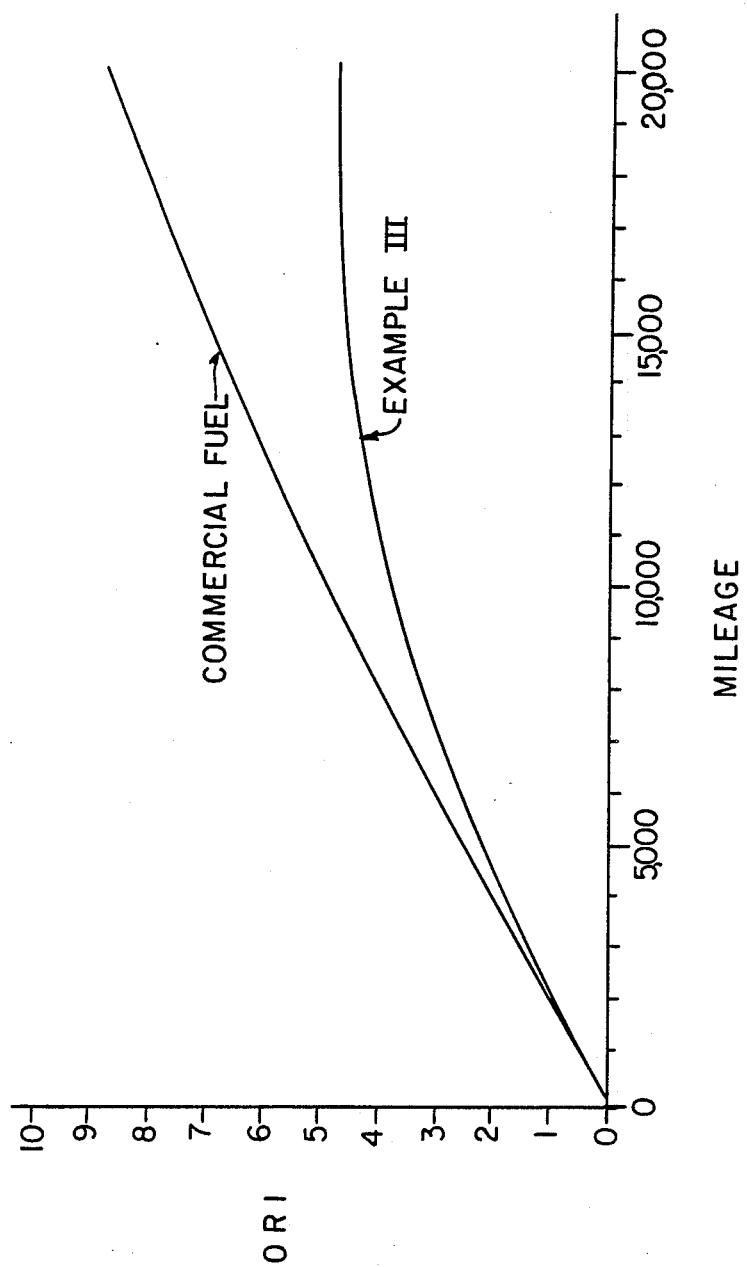

ORI-INHIBITED MOTOR FUEL COMPOSITION

BACKGROUND OF THE INVENTION

1. Field of the Invention

This invention relates to a deposit- and ORI-inhibited motor fuel composition which promotes engine valve cleanliness and inhibits valve sticking. More particularly, this invention relates to a motor fuel composition comprising a base fuel and (I) the reaction product of (a) a hydrocarbyl-substituted dibasic acid anhydride and (b) a polyoxyalkylene diamine; (II) a polymeric component which is a polyolefin polymer/copolymer or the corresponding aminated or hydrogenated polymer/copolymer, or mixtures thereof, of a $C_2$-$C_{10}$ hydrocarbon; (III) a polyalkylene glycol having a molecular weight in the range of 500-2000; and (IV) a lubricating oil composition.

2. Information Disclosure Statement

Co-assigned U.S. patent application Ser. No. 211,937, filed June 27, 1988 (D#79,103) discloses an ORI-and deposit-inhibited motor fuel composition which promotes engine valve cleanliness and inhibits valve sticking, the motor fuel composition comprising a base fuel and (I) the reaction product of (a) a hydrocarbyl-substituted dibasic acid anhydride and (b) a polyoxyalkylene diamine; (II) a polymeric component which is a polyolefin polymer/copolymer or the corresponding aminated or hydrogenated polymer/copolymer, or mixtures thereof, of a $C_2$-$C_{10}$ hydrocarbon; (III) a polyalkylene glycol having a molecular weight in the range of 500-2000; and (IV) a lubricating oil composition.

Co-assigned U.S. patent application Ser. No. 211,937, filed June 27, 1988 and incorporated herein by reference now abandoned, discloses an ORI and deposit-inhibited motor fuel composition comprising (I) the reaction product of a hydrocarbyl-substituted dibasic acid anhydride and a polyoxyalkylene diamine, and (II) an optional polymeric component.

Co-assigned U.S. patent application Ser. No. 84,354, filed Aug. 12, 1987 now U.S. Pat. No. 4,801,440 discloses a motor fuel composition comprising (I) the reaction product of the polyoxyalkylene diamine of co-assigned U.S. Pat. No. 4,747,851, a dibasic acid anhydride, and a hydrocarbyl polyamine, and (II) a mixture comprising polyisobutylene ethylene diamine and polyisobutylene in a hydrocarbon solvent.

Co-assigned U.S. Pat. No. 4,747,851 discloses a novel polyoxyalkylene diamine compound of the formula:

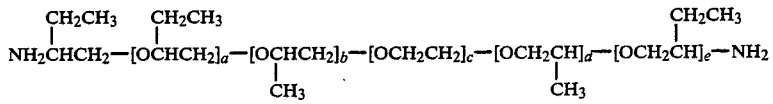

where c has a value from about 5-150, b+d has a value from about 5-150, and a+e has a value from about 2-12. Motor fuel compositions comprising the novel polyoxyalkylene diamine, alone or in combination with a polymer/copolymer additive are also disclosed.

Co-assigned U.S. patent application Ser. No. 000,230, filed Jan. 2, 1987 now abandoned and replaced with a C-I-P application, now U.S. Pat. No. 4,810,261 discloses a motor fuel composition comprising the reaction product of the polyoxyalkylene diamine of U.S. Pat. No. 4,747,851, a dibasic acid anhydride, and a hydrocarbyl polyamine. An optional additional polymer/copolymer additive with a molecular weight of 500-3500 may also be employed in conjunction with the reaction product additive.

Co-assigned U.S. Pat. No. 4,659,337 discloses the use of the reaction product of maleic anhydride, a polyether polyamine containing oxyethylene and oxypropylene ether moieties, and a hydrocarbyl polyamine in a gasoline motor fuel to reduce engine ORI and provide carburetor detergency.

Co-assigned U.S. Pat. No. 4,659,336 discloses the use of the mixture of: (i) the reaction product of maleic anhydride, a polyether polyamine containing oxyethylene and oxypropylene ether moieties, and a hydrocarbyl polyamine; and (ii) a polyolefin polymer/copolymer as an additive in motor fuel compositions to reduce engine ORI.

Co-assigned U.S. Pat. No. 4,631,069 discloses an alcohol-containing motor fuel composition which additionally comprises an anti-wear additive which is the reaction product of a dibasic acid anhydride, a polyoxyisopropylene diamine of the formula

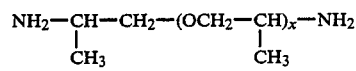

where x has a value of 2-68, and an n-alkyl-alkylene diamine.

Co-assigned U.S. Pat. No. 4,643,738 discloses a motor fuel composition comprising a deposit-control additive which is the reaction product of a dibasic acid anhydride, a polyoxyisopropylene diamine of the formula

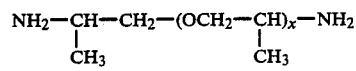

where x has a value of 2-50, and an n-alkyl-alkylene diamine.

U.S. Pat. No. 4,604,103 discloses a motor fuel deposit control additive for use in internal combustion engines which maintains cleanliness of the engine intake system without contributing to combustion chamber deposits or engine ORI. The additive disclosed is a hydrocarbyl polyoxyalkylene polyamine ethane of molecular weight range 300-2500 having the formula

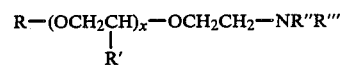

where R is a hydrocarbyl radical of from 1 to about 30 carbon atoms; R' is selected from methyl and ethyl; x is an integer from 5 to 30; and R" and R"' are independently selected from hydrogen and —(CH$_2$CH$_2$N-H—)$_y$—H where y is an integer from 0-5.

Co-assigned U.S. Pat. No. 4,581,040 discloses the use of a reaction product as a deposit inhibitor additive in fuel compositions. The reaction product is a condensate product of the process comprising:

(i) reacting a dibasic acid anhydride with a polyoxyisopropylenediamine of the formula

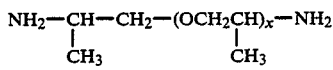

where x is a numeral of about 2-50, thereby forming a maleamic acid;

(ii) reacting said maleamic acid with a polyalkylene polyamine, thereby forming a condensate product; and (iii) recovering said condensate product.

U.S. Pat. No. 4,357,148 discloses a motor fuel additive useful in controlling ORI which is the combination of (a) an oil-soluble aliphatic polyamine containing at least one olefinic polymer chain, and (b) a polymer, copolymer, or corresponding hydrogenated polymer or copolymer of a $C_2$-$C_6$ mono olefin with a molecular weight of 500-1500.

U.S. Pat. No. 4,166,726 discloses a fuel additive which is the combination of (i) the reaction product of an alkylphenol, an aldehyde, and an amine, and (ii) a polyalkylene amine.

U.S. Pat. Nos. 3,960,515 and 3,898,056 disclose the use of a mixture of high and low molecular weight hydrocarbyl amines as a detergent and dispersant in motor fuel compositions.

U.S. Pat. No. 3,438,757 discloses the use of hydrocarbyl amines and polyamines with a molecular weight range of 450-10,000, alone or in combination with a lubricating mineral oil, as a detergent for motor fuel compositions.

SUMMARY OF THE INVENTION

The motor fuel composition of the instant invention comprises a mixture of hydrocarbons boiling in the range from about 90°-450° F. and additionally comprises:

(I) from 0.0005-5.0 weight percent of the reaction product obtained by reacting, at a temperature of 30° C.-200° C:

(a) 1.5-2.5 moles of a hydrocarbyl-substituted dibasic acid anhydride of the formula

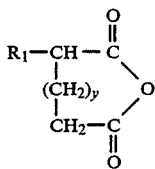

where $R_1$ is a hydrocarbyl group having a molecular weight range of 500-2000 and y has a value of 0-3;

(b) 0.5-1.5 moles of a polyoxyalkylene diamine of the formula

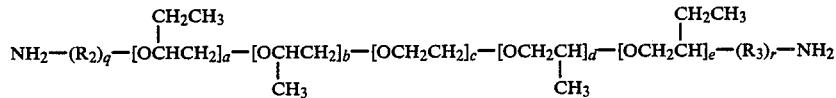

where $R_2$ and $R_3$ are $C_1$-$C_{12}$ alkylene groups, q and r are integers having a value of 0 or 1, c has a value from 2-150, b+d has a value from 2-150, and a+e has a value from 0-12;

(II) from 0.001-1 0 weight percent of a polyolefin polymer, copolymer, or the corresponding aminated or hydrogenated polymer or copolymer, or mixtures thereof, of a $C_2$-$C_{10}$ hydrocarbon, said polyolefin polymer or copolymer having a molecular weight in the range of 500-10,000;

(III) from 0.001-1.0 weight percent of a polyalkylene glycol having a molecular weight in the range of 500-2000; and (IV) from 0.001-1.0 weight percent of a lubricating oil.

The instant invention is also directed to a method of blending the abovedescribed motor fuel composition, and a concentrate composition used to prepare the abovedescribed motor fuel composition.

BRIEF DESCRIPTION OF THE DRAWINGS

FIG. 1 illustrates the results of a road simulator test which measured engine ORI vs. simulated miles for a motor fuel composition of the instant invention and a motor fuel composition comprising a commercial fuel additive.

DETAILED EMBODIMENTS OF THE INVENTION

Combustion of a hydrocarbon motor fuel in an internal combustion engine generally results in the formation and accumulation of deposits on various parts of the combustion chamber as well as on the fuel intake and exhaust systems of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs, which causes engine knock. In addition, the accumulation of deposits within the combustion chamber reduces the volume of the combustion zone, causing a higher than design compression ratio in the engine. This, in turn, also results in serious engine knocking. A knocking engine does not effectively utilize the energy of combustion. Moreover, a prolonged period of engine knocking will cause stress fatigue and wear in vital parts of the engine. The above-described phenomenon is characteristic of gasoline powered internal combustion engines. It is usually overcome by employing a higher octane gasoline for powering the engine, and hence has become known as the engine octane requirement increase (ORI) phenomenon. It would therefore be highly advantageous if engine ORI could be substantially reduced or eliminated by preventing or modifying deposit formation in the combustion chambers of the engine.

Another problem common to internal combustion engines relates to the accumulation of deposits in the carburetor which tend to restrict the flow of air through the carburetor at idle and at low speed, resulting in an overrich fuel mixture. This condition also promotes incomplete fuel combustion and leads to rough engine idling and engine stalling. Excessive hydrocarbon and carbon monoxide exhaust emissions are also produced under these conditions. It would therefore be desirable from the standpoint of engine operability and overall air quality to provide a motor fuel composition which minimizes or overcomes the abovedescribed problems.

A third problem common to internal combustion engines is the formation of intake valve deposits. Intake valve deposits interfere with valve closing and eventually result in valve burning. Such deposits interfere with valve motion and valve sealing, cause valve sticking, and in addition reduce volumetric efficiency of the engine and limit maximum power. Valve deposits are usually a result of thermal and oxidative unstable fuel or lubricating oil oxidation products. Hard carbonaceous deposits collect in the tubes and runners that conduct ther exhaust gas recirculation (EGR) gases. These deposits are believed to be formed from exhaust particles which are subjected to rapid cooling while mixing with the air-fuel mixture. Reduced EGR flow can result in engine knock and $NO_x$ emission increases. It would therefore be desirable to provide a motor fuel composition which minimizes or overcomes the formation of intake valve deposits and subsequent valve sticking problems.

It is an object of this invention is to provide a motor fuel composition which is deposit-resistant, exhibits ORI-inhibition, promotes engine valve cleanliness and inhibits valve sticking when employed in an internal combustion engine. Another object of this invention is to provide a method of blending the abovedescribed components into a base motor fuel composition. Yet another object of this invention is to provide a concentrate composition comprising the abovedescribed components for use in a motor fuel composition.

It is a feature of motor fuel compositions of the instant invention that combustion chamber deposit formation is minimized, with concomitant reduction of engine ORI. It is another feature of this invention that such motor fuel composition are deposit-resistant and specifically exhibit reduced intake valve deposit formation, with concomitant reduction in valve sticking.

Motor fuel compositions of the instant invention are advantageous in that they exhibit reduced engine ORI, reduced valve deposit formation, and reduced valve sticking problems.

The ORI and deposit-inhibited motor fuel composition of the instant invention comprises a base fuel and:
(I) the reaction product of (a) a hydrocarbyl-substituted dibasic acid anhydride and (b) a polyoxyalkylene diamine; (II) a polymeric component which is a polyolefin polymer/copolymer or the corresponding aminated or hydrogenated polymer/copolymer, or mixtures thereof; (III) a polyalkylene glycol having a molecular weight in the range of 500-2000; and (IV) a lubricating oil composition.

The hydrocarbyl-substituted dibasic acid anhydride reactant used to prepare the reaction product component of the instant invention may be represented by the formula

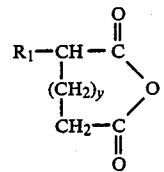

where $R_1$ is a hydrocarbyl group, preferably a polypropenyl or polybutenyl group, most preferably a polyisobutenyl group, having a molecular weight range of 500-10,000, preferably 500-2500, most preferably 600-1500, most preferably about 1290, and y has a value of 0-3. Where $R_1$ is the preferred polyisobutenyl group, y preferably has a value of 0, and the preferred hydrocarbyl-substituted dibasic anhydride reactant for use is a polyisobutenyl succinic acid anhydride of the formula:

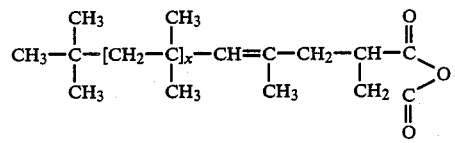

where x has a value of 10-20, preferably 20-25. This polyisobutenyl succinic acid anhydride is most preferably formed by reacting maleic anhydride and a polybutene such as a polybutene commercially available from Amoco Chemical Company under the INDOPOL series trade name, the most preferred polybutene reactant being commercially available as INDOPOL H-300. Methods of formulating the abovedescribed polyisobutyenyl succinic acid anhydride reactant are disclosed by, inter alia, U.S. Pat. Nos. 4,496,746 (Powell), 4,431,825 (Powell), 4,414,397 (Powell), and 4,325,876 (Chafetz), all incorporated herein by reference.

The polyoxyalkylene diamine reactant used to prepare the reaction product component of the instant invention is a diamine of the formula

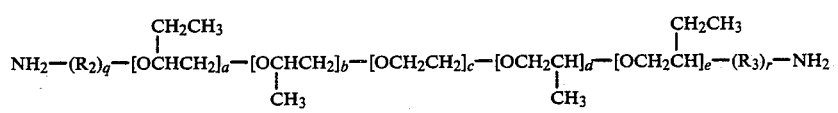

where $R_2$ and $R_3$ are $C_1$-$C_{12}$ alkylene groups, preferably $C_2$-$C_6$ alkylene group, most preferably a propylene or butylene group, q and r are integers having a value of 0 or 1, preferably with q=1 and r=0, c has a value from about 2-150, preferably 2-50; b+d has a value from about 2-150, preferably 2-50; and a+e has a value from about 0-12, preferably 2-8. In one preferred embodiment, q=1, r=0, $R_2$ is a butylene group and the polyoxyalkylene diamine reactant is therefore of the formula

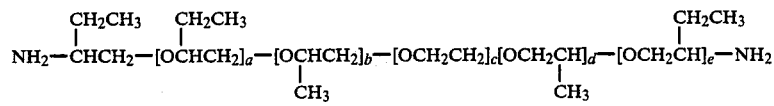

where c has a value of from 2-150, preferably 2-50, b+d has a value of from 2-150, preferably 2-50 and a+e has a value of 2-12, preferably 2-8.

In another preferred embodiment, q=1, r=0, $R_2$ is a propylene group, a+e has a value of zero, and the polyoxyalkylene diamine reactant is of the formula

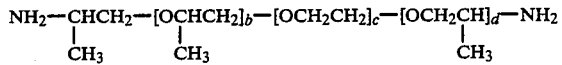

where c and b+d, respectively, have a value of from 2-150, preferably 2-50. Polyoxyalkylene diamines of the above structure suitable for use include those available from Texaco Chemical Co. under the JEFFAMINE ED-Series trade name. Specific examples of such compounds are set forth below:

| Trade Name | Approx. Value | | Approx. Mol. Wt. |
|---|---|---|---|
| | c | b + d | |
| ED-600 | 8.5 | 2.5 | 600 |
| ED-900 | 15.5 | 2.5 | 900 |
| ED-2001 | 40.5 | 2.5 | 2000 |
| ED-4000 | 86.0 | 2.5 | 4000 |
| ED-6000 | 131.5 | 2.5 | 6000 |

The reaction product component of the instant invention is prepared by reacting 1.5-2.5 moles, preferably about 2 moles of hydrocarbyl-substituted dibasic acid anhydride with 0.5-1.5 moles, preferably about 1 mole of the prescribed polyoxyalkylene diamine reactant, at a temperature of 30° C.-200° C., preferably 90° C.-1 5o C. until all of the water has been removed from the system. The reaction is preferably carried out in the presence of a solvent. A preferred solvent is one which will distill with water azeotropically. Suitable solvents include hydrocarbons boiling in the gasoline boiling range of about 30° C. to about 200° C. Generally, this will include saturated and unsaturated hydrocarbons having from about 5 to about 10 carbon atoms. Specific suitable hydrocarbon solvents include hexane, cyclohexane, benzene, toluene, and mixtures thereof. Xylene is the preferred solvent. The solvent can be present in an amount of up to about 90% by weight of the total reaction mixture. Once the reaction has been completed, the reaction product can then be separated from the solvent using conventional means, or left in admixture with some or all of the solvent.

The following examples illustrate the preferred method of preparing the novel reaction product component of the instant invention. It will be understood that the following examples are merely illustrative, and are not meant to limit the invention in any way. In the examples, all parts are parts by weight unless otherwise specified.

EXAMPLE I 408 parts of polyisobutenyl succinic acid anhydride (prepared by reacting maleic anhydride and INDOPOL H-300), 779 parts of xylene, and 374.6 parts of a polyoxyalkylene diamine were reacted at a temperature of about 90°-150° C. until no more water could be removed from the system. The polyoxyalkylene diamine was of the formula

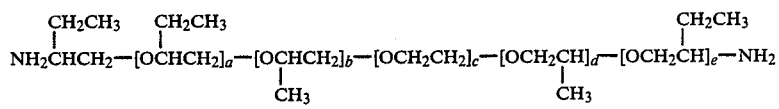

where c had an approximate value of 40.5, b+d had an approximate value of 40.5, and a+e had an approximate value of 2.5. The reaction product was then filtered and stripped of remaining solvent under vacuum, and identified by IR, NMR, and elemental analysis.

EXAMPLE II 2776 parts of polyisobutenyl succinic acid anhydride (prepared by reacting maleic anhydride and INDOPOL H-300), 4740 parts of xylene, and 2000 parts of a polyoxyalkylene diamine are reacted at a temperature of about 90°-150° C. until no more water can be removed from the system. The polyoxyalkylene diamine (JEFFAMINE ED-2001) may be represented by the formula

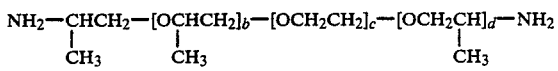

where c has an approximate value of 40.5, and b+d has an approximate value of 2.5.

Example I exemplifies the preferred method of preparing and the preferred reaction product component of the instant invention. It is hypothesized that the active portion of the reaction product composition of Example I is a bis-polyisobutenyl succinimide having the structure:

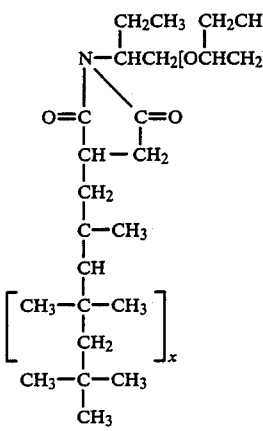 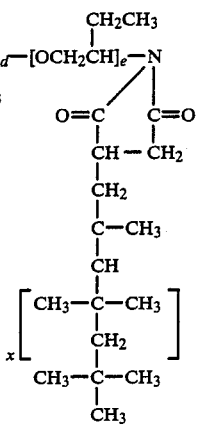

where x has the value of 21, c has an approximate value of 40.5, and a+e has an approximate value of 2.5.

The polymeric component of the motor fuel composition of the instant invention is a polyolefin polymer, copolymer, or corresponding aminated or hydrogenated polymer or copolymer, or mixtures thereof, of a $C_2$–$C_{10}$ hydrocarbon. The polymer/copolymer component is prepared from monoolefins and diolefins or copolymers thereof having an average molecular weight in the range from about 500–10,000, preferably 500–3500, most preferably about 650–2600. Mixtures of olefin polymers with an average molecular weight falling within the foregoing range are also effective. In general, the olefin monomers from which the polyolefin polymer component is prepared are preferably unsaturated $C_2$–$C_6$ hydrocarbons. Specific olefins which may be employed to prepare the polyolefin polymer component include ethylene, propylene, isopropylene, butylene, isobutylene, amylene, hexylene, butadiene, and isoprene. Propylene, isopropylene, butylene, and isobutylene are particularly preferred for use in preparing the polyolefin polymer component. Other polyolefins which may be employed are those prepared by cracking polyolefin polymers or copolymers of high molecular weight to a polymer in the above-noted molecular weight range. Derivatives of the noted polymers obtained by saturating the polymers by hydrogenation or amination of the polymers to produce polymeric mono or polyamines are also effective and are a part of this invention. As used in this description and in the appended claims, the phrase "polymers" is intended to include the polyolefin polymers and their corresponding hydrogenated or aminated derivatives. The polymeric component is usually employed in admixture with a hydrocarbon solvent to facilitate its addition into a base motor fuel composition.

In one preferred embodiment of the instant invention, the polymeric component is polypropylene with an average molecular weight of 750–1000, preferably about 800. In another preferred embodiment, the polymeric component is polyisobutylene with an average molecular weight of 100–1500, preferably about 1300. In yet another preferred embodiment of the instant invention, the polymeric component is a mixture of a major amount of polyisobutylene ethylene diamine and a minor amount of polyisobutylene in admixture with a suitable amount of hydrocarbon solvent. In this embodiment, the polyisobutylene ethylene diamine subcomponent of the polymeric component is typically present in a concentration range of 50–75 parts, preferably about 60 parts by weight, based upon the weight of the entire composition which makes up the polymeric component. The polyisobutylene ethylene diamine subcomponent is of the formula

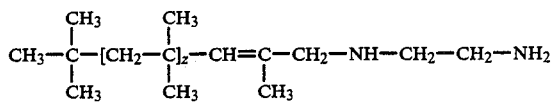

where z has a value of 10–40, preferably 30–35, say 33.

The polyisobutylene subcomponent of the polymeric component is typically present in a concentration range of 5–25 parts, preferably 10–20 parts by weight, based upon the weight of the entire composition which makes up the polymeric component. The polyisobutylene subcomponent is of the formula

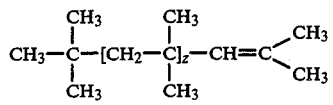

where z again has a value of 10–40, preferably 30–35, say 33.

The hydrocarbon solvent employed to facilitate admixture of the polymeric component into a base motor fuel composition is preferably a light aromatic distillate composition. A commercially available light aromatic distillate composition containing the abovedescribed polyisobutylene ethylene diamine and polyisobutylene compounds in the abovespecified concentrations and therefore most preferred for use as the polymeric component of the instant invention is the commercial gasoline additive ORONITE OGA-472, available from Chevron Chemical Company. ORONITE OGA-472 is a composition containing approximately 60 parts by weight of polyisobutylene ethylene diamine, approximately 13 parts by weight polyisobutylene, and approximately 27 parts by weight light aromatic distillate, including xylene and $C_9$ alkylbenzenes. Fuel compositions containing ORONITE OGA-472 as an additive include those described in U.S. Pat. Nos. 4,141,693, 4,028,065, and 3,966,429.

The polyalkylene glycol component of the motor fuel composition of the instant invention has a molecular weight in the range of 500–2000, preferably 750–1000. The polyalkylene glycol component is preferably selected from the group consisting of polyethylene glycol, polypropylene glycol, and polybutylene glycol, and is most preferably a polypropylene glycol having a molecular weight in the range of 750–1000.

The lubricating oil component of the motor fuel composition of the instant invention may be a natural, synthetic, or heavy oil. Suitable lubricating oils for use in the motor fuel composition of the instant invention are described, for example, at columns 29–30 of U.S. Pat. No. 4,670,173 (Hayashi et al.) (incorporated herein by reference) and include, in one preferred embodiment, natural oils such as animal oils, vegetable oils, mineral lubricating oils (e.g. liquid petroleum oils, solvent-treated and acid-treated mineral oils of paraffinic, naphthenic, and mixed paraffinic-naphthenic types), and lubricating oils derived from shale or coal.

In another preferred embodiment, the lubricating oil employed is a synthetic lubricating oil. Synthetic oils suitable for use include hydrocarbon oils, halo-substituted hydrocarbon oils such as polymerized and interpolymerized olefins, oligo-alkenes, alkylbenzenes, polyphenyls, alkylated diphenyl ethers and sulfides, and substituted and unsubstituted polyalkylenes and alkylene oxide polymers and copolymers (e.g. oils prepared through polymerization of ethylene oxide or propylene oxide, the alkyl and aryl ethers of these polyoxyalkylene polymers, or mono- and polycarboxylic esters thereof such as acetic acid or fatty acid esters). Polyalkylene lubricating oil compositions having a molecular weight in the range of 500–2000, preferably 800–1400 are preferred for use as the lubricating oil component, with polypropylene having a molecular weight in the range of 800–1400 and polyisobutylene having a molecular weight in the range of 800–1000 being particularly preferred.

Yet another particularly preferred class of oils for use as the lubricating oil component are unrefined or refined heavy oils. Unrefined oils are those obtained directly from a natural or synthetic source without further purification treatment. Refined oils are similar to unrefined oils except they have been further treated in one or more purification steps to improve one or more properties. Many such purification techniques (e.g. solvent extraction, secondary distillation, acid or base extraction, filtration, percolation) are well known to those skilled in the art. A particularly preferred class of heavy oils for use are known to those skilled in the art as paraffinic Solvent Neutral Oils (SNO). An example of a paraffinic solvent neutral oil for use as the lubricating oil component of the instant invention is SNO-600, which has a viscosity of 20–60, say 25 cst at 40° C.

The motor fuel composition of the instant invention comprises a major amount of a base motor fuel and: (I) 0.0005–5 0 weight percent, preferably 0.001–1.0 weight percent of the abovedescribed reaction product of hydrocarbyl-substituted dibasic acid anhydride and polyoxyalkylene diamine; (II) 0.001–1.0 weight percent, preferably 0.01–0.5 weight percent of the abovedescribed polymeric component; (III) from 0.001–1.0 weight percent, preferably 0.001–0.5 weight percent of the abovedescribed polyalkylene glycol component; and (IV) 0.001–1.0 weight - percent, preferably 0 001–0.5 weight percent of the abovedescribed lubricating oil component.

This invention is also directed to a method of blending the abovedescribed reaction product, polyolefin polymer/copolymer, polyalkylene glycol and lubricating oil components into a base motor fuel composition. The method of blending comprises introducing into a base fuel: (I) from 0.0005–5.0, preferably 0.001–1.0 weight percent of the abovedescribed reaction product component; (II) from 0.001–1.0, preferably from 0.01–0.5 weight percent of the abovedescribed polymeric component; (III) from 0.001–1.0, preferably from 0.001–0.5 weight percent of the abovedescribed polyalkylene glycol component; and from 0–1.0, preferably 0.001–0.5 weight percent of the abovedescribed lubricating oil component. Each component may be directly introduced into the hydrocarbon base fuel, or may first be admixed with a hydrocarbon solvent such as xylene, toluene, hexane, cyclohexane, benzene, a $C_2$–$C_{10}$ alkylbenzene, and mixtures thereof.

Preferred base motor fuel compositions are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chains or branched chains or paraffins, cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. An example of a motor fuel composition of the instant invention is set forth in Example III, below.

EXAMPLE III

30 PTB of the reaction product set forth in Example I (i.e. 30 pounds of reaction product per 1000 barrels of gasoline, equivalent to about 0.01 weight percent of reaction product component based on the weight of the fuel composition), 100 PTB (about 0.03 weight percent) of a mixture of polyisobutylene ethylene diamine and polyisobutylene in a hydrocarbon solvent (OGA-472), 50 PTB (about 0.017 weight percent) of polypropylene glycol and 50 PTB (about 0.017 weight percent) of heavy oil (SNO-600) are blended with a major amount of a base motor fuel (herein designated as Base Fuel A) which is a premium grade gasoline essentially unleaded (less than 0.05 g of tetraethyl lead per gallon), comprising a mixture of hydrocarbons boiling in the gasoline boiling range consisting of about 22% aromatic hydrocarbons, 11% olefinic carbons, and 67% paraffinic hydrocarbons, boiling in the range from about 90° F. to 450° F.

The motor fuel composition of the instant invention is advantageous in that it exhibits reduced engine ORI. The advantage of the instant invention in controlling engine ORI has been shown by a comparison of the performance of a motor fuel composition of the instant invention and a motor fuel composition, comprising a commercial fuel additive in a road simulator test. In the road simulator test, the ORI exhibited by a motor fuel composition of the instant invention as well as a motor fuel composition comprising 60 PTB (about 0.02 weight percent) of a commercial fuel additive in an unleaded base fuel were measured in an automobile engine (1986 Buick eight cylinder engine) on a simulated road course.

The results of the road simulator test are shown by FIG. 1. As illustrated by FIG. 1, at the end of a 20,000 mile simulation, a motor fuel of the instant invention (as exemplified by Example III) had an average ORI of about 4.8, whereas the motor fuel comprising the commercial additive had an average ORI of about 8.80. The standard deviations of the curves presented in FIG. 1 for the commercial fuel and the fuel of the instant invention were 1.65 and 0.50, respectively.

In addition, the motor fuel composition of the instant invention is advantageous over other ORI-reduced motor fuel compositions, such as that disclosed in abovereferenced and co-assigned U.S. patent application Ser. No. 211,937, in that it exhibits reduced engine valve stickiness as well as intake valve cleanliness and reduced engine ORI. It has been found that although the motor fuel composition disclosed in co-assigned U.S. patent application Ser. No. 211,937 exhibits reduced engine ORI, it also exhibits intake valve sticking and concomitant cold starting problems. However, it has been found that use of the abovedescribed concentrations of the polyalkylene glycol and lubricating oil components of the instant invention produces a synergistic effect over either component alone, in terms of prevention of intake valve stickiness while preserving the ORI reduction and valve cleanliness characteristics of the motor fuel composition of the instant invention.

The intake valve stickiness of different motor fuel compositions of the instant invention was measured via the Honda Generator Test. The Honda Generator Test employs a Honda ES6500 generator with the following specifications:

| Type | 4-stroke, overhead cam, 2-cylinder |
|---|---|
| Cooling system | Liquid-cooled |
| Displacement | 369 cubic cm. (21.9 cu. in) |
| Bore × stroke | 56 × 68 mm (2.3 × 2.7 in) |
| Maximum Horsepower | 12.2 HP/3600 rpm |
| Maximum Torque | 240 kg–cm (17.3 ft-bl)/3000 rpm |

Each generator was equipped with an auto-throttle controller to maintain the rated speed when load was applied. Load was applied to each generator by plugging in water heaters. Various loads were simulated by changing the size of the water heaters connected to the generator.

The procedure for the Honda Generator Test may be described as follows. The Test was started with a new or clean engine (clean valve, manifold, cylinder head, combustion chamber) and a new charge of lubricant. The generator was operated for 80 hours on the fuel to be tested following the test cycle of 2 hours at 1500 Watt load and 2 hours at 2500 Watt load. The engine was thereafter disassembled and the cylinder head stored, with valve spring and seal removed, in a freezer overnight at 5° F. A trained rater quantified the effort to push open the intake valves by hand. The amount of effort was correlated to valve sticking problems in vehicles: i.e. valves that could not be pushed open by hand generally correlated with cold starting problems in vehicles. Finally, the intake system components (valve, manifold, cylinder head) and combustion chamber were rated visually according to standard Coordinating Research Council (CRC) procedures. The performance of the test fuel was measured in part by the cleanliness of the intake system components. Results of the Test for various fuel compositions are set forth in Table I below.

TABLE I

HONDA GENERATOR TEST RESULTS

| | Valve Ratings | |
|---|---|---|
| Fuel Additive | Valve #1 | Valve #2 |
| 1. 30 PTB Example I<br>100 PTB OGA-472<br>200 PTB SNO-600 oil | Light/Moderate<br>Light/Moderate<br>Moderate<br>Moderate | Light<br>Light<br>Moderate<br>Light |
| 2. 30 PTB Example I<br>75 PTB OGA-472<br>90 PTB polypropylene<br>glycol (molec. wt. 1000) | Moderate/Heavy | Moderate/Light |
| 3. 30 PTB Example I<br>75 PTB OGA-472<br>70 PTB SNO-600 oil<br>70 PTB polypropylene<br>glycol (molec. wt. 1000) | Light/Moderate | Light |
| 4. 30 PTB Example I<br>75 PTB OGA-472<br>35 PTB SNO-600 oil<br>35 PTB polypropylene<br>glycol (molec. wt. 1000) | Moderate | Moderate |

Fuel Additive combinations Nos. 3 and 4 in Table I represent motor fuel compositions of the instant invention, whereas Fuel Additive combination No. 1 comprises the lubricating oil component but does not contain the essential polyalkylene glycol component of the instant invention, and combination No. 2 comprises the polyalkylene glycol component but does not contain the essential lubricating oil component of the instant invention. Nos. 3 and 4 are particularly preferred embodiments of the instant invention. Nos. 1, 3, and 4 exhibited light to moderate valve sticking, whereas No. 2 experienced some heavy valve sticking. Nos. 3 and 4 exhibited synergism between the polyalkylene glycol and lubricating oil components in that lesser concentrations of the polyalkylene glycol and lubricating oil components (70 PTB and 35 PTB in Nos. 3 and 4, respectively) achieved light to moderate valve sticking, whereas greater concentrations of the polyalkylene glycol and lubricating oil components (210 PTB lubricating oil in No. 1 and 90 PTB polyalkylene glycol in No. 2) were required in Nos. 1 and 2 to achieve approximately equivalent levels of valve sticking.

ORI tendencies and intake valve cleanliness were also measured for several motor fuel compositions on several 2.0 liter 1983 Chevrolet (Throttle Body Injector) (TBI) engines, as set forth in Table II below.

TABLE II 2.0 LITER CHEVROLET TEST RESULTS

| | Engine A | | Engine B | | Engine C | | Average | |
|---|---|---|---|---|---|---|---|---|
| Fuel Additive | ORI | Valve Rating | ORI | Valve Rating | ORI | Valve Rating | ORI* | Valve Rating** |
| 1. 30 PTB Example I<br>100 PTB OGA-472<br>210 PTB SNO-600 oil | 8 | 8.3 | 6 | 7.0 | 10 | 7.3 | 8.0 | 7.5 |
| 2. 30 PTB Example I<br>205 PTB OGA-472 | 5 | 8.0 | 5 | 6.9 | 10 | 7.8 | 6.7 | 7.6 |
| 3. 30 PTB Example I<br>100 PTB OGA-472 | 4 | 8.3 | 6 | 7.0 | 7 | 7.8 | 5.7 | 7.7 |

TABLE II-continued

2.0 LITER CHEVROLET TEST RESULTS

| Fuel Additive | Engine A ORI | Engine A Valve Rating | Engine B ORI | Engine B Valve Rating | Engine C ORI | Engine C Valve Rating | Average ORI* | Average Valve Rating** |
|---|---|---|---|---|---|---|---|---|
| 50 PTB SNO-600 oil 50 PTB polypropylene glycol (molec. wt. 1000) | | | | | | | | |

*Average Octane Requirement Increase over total engine run
**Average CRC Valve Rating System: 10 = clean valve Fuel additive combinations Nos. 1 and 3 in Table II represent motor fuel compositions of the instant invention. No. 3 illustrates that a motor fuel comprising all four subcomponents of the motor fuel of the instant invention had the best overall performance (i.e. lowest average ORI and highest average valve rating) of the fuels tested. No. 3 is a particularly preferred embodiment of the instant invention.

It has also been found that motor fuel compositions of the instant invention are effective in resisting the accumulation of deposits in the carburetor, intake manifold, and intake valves of internal combustion engines. The carburetor intake valve and intake manifold detergency properties of a commercially available motor fuel and a motor fuel composition of the instant invention (Example III) were measured via the Merit Rating Test. This test may be described as follows. After running a Chevrolet 2.0 liter engine with a given motor fuel composition, portions of the engine were disassembled and various engine components were visually examined to determine the extent of deposit formation. This was determined via a visual rating system scaled from 1–10, with a value of 10 being a clean component and a value of 1 being a deposit-laden component.

The experimental results obtained from the Merit Rating Test are set forth in Table III. As illustrated by Table III, a motor fuel composition of the instant invention (Example III) was superior to a commercially available fuel in terms of both engine ORI and carburetor and valve deposit control (based upon merit ratings and valve deposit weights).

TABLE III

1983 Chevrolet 2.0 liter Engine Merit Rating Results

| | Instant Invention (Example III) | Base Fuel A + 60 PTB Commerical Additive |
|---|---|---|
| ORI | 5 | 12 |
| MERIT RATINGS:* | | |
| TBI PLATE | 9.7 | 9.0 |
| PORTS & RUNNERS (AVG.) | 8.63 | 6.57 |
| VALVES-RATING | 7.6 | 5.6 |
| WT. (Mg) | 0.37 | 1.42 |

*Merit Rating of 10 = clean (no deposits)

For convenience in shipping and handling, it is useful to prepare a concentrate of the abovedescribed reaction product, polymeric, polyalkylene glycol, and lubricating oil components of the motor fuel of the instant invention. The concentrate may be prepared in a suitable liquid solvent such as toluene and xylene, with xylene being preferred. In a preferred mode of preparing a concentrate of the instant invention, approximately 0.1–10.0, preferably 5.0–10.0 percent of the reaction product of Example 1, approximately 25.0–75.0, preferably 50.0–60.0 weight percent of the abovedescribed aromatic distillate-polyisobutylene ethylene diamine-polyisobutylene mixture, approximately 5.0–20.0 weight percent of the abovedescribed polyalkylene glycol component and approximately 5.0–20.0 weight percent of the abovedescribed lubricating oil component are employed in admixture with 25.0–50.0, preferably 30.0–40.0 weight percent of aromatic hydrocarbons, preferably xylene. All weight percents are based upon the total weight of the concentrate. Concentrate compositions of the instant invention are advantageous over ORI-control concentrate formulations such as that disclosed in co-assigned U.S. patent application Ser. No. 84,354 (Sung et al.) in that concentrate compositions of this invention resist precipitation and hence may be more readily stored and transported.

In one embodiment of the instant invention, blending of the abovedescribed motor fuel is accomplished by introducing into the base fuel the abovedescribed concentrate composition of the instant invention.

Motor fuel and concentrate compositions of the instant invention may additionally comprise any of the additives generally employed in motor fuel compositions. Thus, compositions of the instant invention may additionally contain conventional carburetor detergents, anti-knock compounds such as tetraethyl lead compounds, anti-icing additives, upper cylinder lubricating oils, and the like. In particular, such additional additives may include compounds such as polyolefin polymers, copolymers, or corresponding hydrogenerated polymers or copolymers of $C_2$–$C_6$ unsaturated hydrocarbons, or mixtures thereof. Additional additives may include substituted or unsubstituted monoamine or polyamine compounds such as alkyl amines, ether amines, and alkyl-alkylene amines or combinations thereof.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A motor fuel composition comprising a mixture of hydrocarbons boiling in the range from about 90° F.–450° F. and additionally comprising:
   (I) from 0.0005–5.0 weight percent of the reaction product obtained by reacting, at a temperature of 30° C.–200° C:
      (a) 1.5–2.5 moles of a hydrocarbyl-substituted dibasic acid anhydride of the formula $$R_1-CH-C \atop (CH_2)_y \quad \diagdown O \atop CH_2-C \atop \|\atop O$$

where $R_1$ is a hydrocarbyl group having a molecular weight range of 500–2000 and y has a value of 0–3;

(b) 0.5–1.5 moles of a polyoxyalkylene diamine of the formula $$NH_2-(R_2)_q-[OCHCH_2]_a-[OCHCH_2]_b-[OCH_2CH_2]_c- \atop \qquad\qquad\qquad\; CH_2CH_3 \qquad CH_3$$

$$-[OCH_2CH]_d-[OCH_2CH]_e-(R_3)_r-NH_2 \atop \quad CH_2CH_3 \qquad CH_3$$

where $R_2$ and $R_3$ are $C_1$–$C_{12}$ alkylene groups, q and r are integers having a value of 0 or 1, c has a value from 2–150, b+d has a value from 2–150, and a+e has a value from 0–12;

(II) from 0.001–1.0 weight percent of a polyolefin polymer, copolymer, or the corresponding aminated or hydrogenated polymer or copolymer, or mixtures thereof, of a $C_2$–$C_{10}$ hydrocarbon, said polyolefin polymer or copolymer having a molecular weight in the range of 500–10,000;

(III) from 0.001–1.0 weight percent of a polyalkylene glycol having a molecular weight in the range of 500–2000; and (IV) from 0.001–1.0 weight percent of a lubricating oil.

2. A motor fuel composition according to claim 1, where $R_1$ is a polypropenyl or polybutenyl group with a molecular weight range of 500–2500.

3. A motor fuel composition according to claim 2, where $R_1$ is a polyisobutenyl group with a molecular weight range of 600–1500.

4. A motor fuel composition according to claim 3, where $R_1$ is a polyisobutenyl group with a molecular weight of about 1290.

5. A motor fuel composition according to claim 1, where said hydrocarbyl-substituted dibasic acid anhydride reactant is a polyisobutenyl succinic acid anhydride of the formula:

$$CH_3-\underset{\underset{CH_3}{|}}{\overset{\overset{CH_3}{|}}{C}}-[CH_2-\underset{\underset{CH_3}{|}}{\overset{\overset{CH_3}{|}}{C}}]_x-CH=\underset{\underset{CH_3}{|}}{C}-CH_2-CH-\overset{O}{\overset{\|}{C}} \diagdown O \atop CH_2-C \atop \|\atop O$$

where x has a value of 10–30.

6. A motor fuel composition according to claim 5, where x has a value of 20–25.

7. A motor fuel composition according to claim 1, where said polyoxyalkylene diamine reactant is of the formula $$NH_2CHCH_2-[OCHCH_2]_a-[OCHCH_2]_b-[OCH_2CH_2]_c-[OCH_2CH]_d-[OCH_2CH]_e-NH_2 \atop \;\;CH_2CH_3 \quad CH_2CH_3 \qquad\qquad\qquad\qquad\qquad\quad CH_3 \qquad\qquad CH_3 \qquad CH_2CH_3$$

where c has a value from about 2–50, b+d has a value from about 2–50, and a+e has a value from about 2–8.

8. A composition according to claim 1, where said polyoxyalkylene diamine reactant is of the formula $$NH_2-CHCH_2-[OCHCH_2]_b-[OCH_2CH_2]_c-[OCH_2CH]_d-NH_2 \atop \quad CH_3 \qquad\;\; CH_3 \qquad\qquad\qquad\qquad\; CH_3$$

where c has a value of 2–50, and b+d has a value of 2–50.

9. A motor fuel composition according to claim 1, where said polyolefin polymer or copolymer component is derived from one or more hydrocarbons selected from the group consisting of ethylene, propylene, butylene, isobutylene, amylene, hexylene, isoprene, and butadiene.

10. A motor composition according to claim 1, where said polyolefin polymer, copolymer, or corresponding hydrogenated polymer or copolymer component has a molecular weight in the range of about 650–2600.

11. A motor fuel composition according to claim 10, where said polyolefin polymer component is a polypropylene having a molecular weight in the range of about 750–1000.

12. A motor composition according to claim 11, where said polyolefin polymer component is a polypropylene with an average molecular weight of about 800.

13. A motor fuel composition according to claim 10, where said polyolefin polymer component is a polyisobutylene having a molecular weight in the range of about 1000–1500.

14. A motor fuel composition according to claim 13, where said polyolefin polymer component is a polyisobutylene having an average molecular weight of about 1300.

15. A motor fuel composition according to claim 1, where said polyolefin polymer component is a mixture comprising a hydrocarbon solvent and:

(a) 50–75 parts by weight of polyisobutylene ethylene diamine of the formula $$CH_3-\underset{\underset{CH_3}{|}}{\overset{\overset{CH_3}{|}}{C}}-[CH_2-\underset{\underset{CH_3}{|}}{\overset{\overset{CH_3}{|}}{C}}]_z-CH=\underset{\underset{CH_3}{|}}{C}-CH_2-NH-CH_2-CH_2-NH_2$$

and (b) 5–25 parts by weight of polyisobutylene of the formula $$CH_3-\underset{\underset{CH_3}{|}}{\overset{\overset{CH_3}{|}}{C}}-[CH_2-\underset{\underset{CH_3}{|}}{\overset{\overset{CH_3}{|}}{C}}]_z-CH-C\diagup^{CH_3}_{CH_3}$$

where z has a value of 10-40.

16. A motor fuel composition according to claim 15, where z has a value of 30-35.

17. A motor fuel composition according to claim 15, where said hydrocarbon solvent is an aromatic distillate comprising xylene and $C_9$ alkylbenzene compounds.

18. A motor fuel composition according to claim 1, where said polyalkylene glycol component has a molecular weight in the range of 750-1000.

19. A motor fuel composition according to claim 1, where said polyalkylene glycol is selected from the group consisting of polyethylene glycol, polypropylene glycol, and polybutylene glycol.

20. A motor fuel composition according to claim 1, where said polyalkylene glycol component is a polypropylene glycol having a molecular weight in the range of 750-1000.

21. A motor fuel composition according to claim 1, where said lubricating oil is a natural lubricating oil.

22. A motor fuel composition according to claim 1, where said lubricating oil is a synthetic lubricating oil.

23. A motor fuel composition according to claim 22, where said synthetic lubricating oil is a polyalkylene composition having a molecular weight in the range of 500-2000.

24. A motor fuel composition according to claim 23, where said polyalkylene composition is a polypropylene composition having a molecular weight in the range of 800-1400.

25. A motor fuel composition according to claim 23, where said polyalkylene composition is a polyisobutylene composition having a molecular weight in the range of 800-1000.

26. A motor fuel composition according to claim 1, where said lubricating oil is a heavy oil composition.

27. A motor fuel composition comprising a mixture of hydrocarbons boiling in the range from about 90° F.-450° F., and additionally comprising:

(I) from about 0.001-1.0 weight percent of the reaction product obtained by reacting, at a temperature of 90° C.-150° C.:

(a) about 2 moles of a polyisobutenyl succinic acid anhydride of the formula

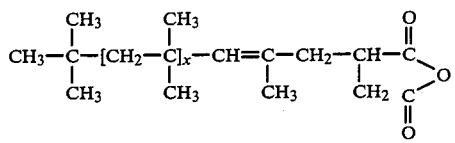

where x has a value of 20-25, and (b) about 1 mole of a polyoxyalkylene diamine of the formula

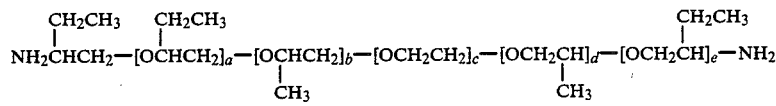

where c has a value from about 2-50, b+d has a value from about 2-50, and a+e has a value from about 2-8;

(II) from about 0.01-0.5 weight percent of a mixture comprising an aromatic distillate and:

(a) about .60 parts by weight of polyisobutylene ethylene diamine of the formula

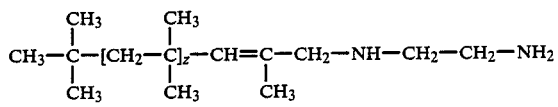

and (b) about 10-20 parts by weight of polyisobutylene of the formula

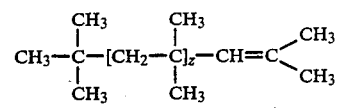

where z has a value of 30-35;

(III) from 0.001-1.0 weight percent of a polypropylene glycol having a molecular weight in the range of 750-1000; and (IV) from 0.001-1.0 weight percent of a heavy oil composition.

28. A concentrate composition comprising aromatic hydrocarbons and additionally comprising:

(I) from 0.1-10.0 weight percent of the reaction product obtained by reacting, at a temperature of 30° C.-200° C.:

(a) 1.5-2.5 moles of a hydrocarbyl-substituted dibasic acid anhydride of the formula

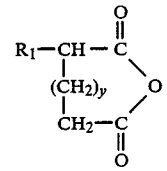

where $R_1$ is a hydrocarbyl group having a molecular weight range of 500-2000 and y has a value of 0-3;

(b) 0.5-1.5 moles of a polyoxyalkylene diamine of the formula

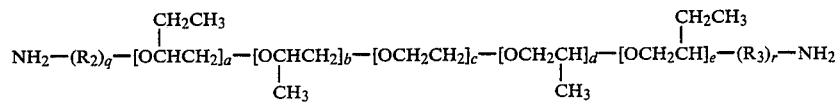

where $R_2$ and $R_3$ are $C_1-C_{12}$ alkylene groups, q and r are integers having a value of 0 or 1, c has a value from 2-150, b+d has a value from 2-150, and a+e has a value from 0-12;

(II) from 25.0-75.0 weight percent of a polyolefin polymer, copolymer, or the corresponding aminated or hydrogenated polymer or copolymer, or mixtures thereof, of a $C_2$-$C_{10}$ hydrocarbon, said polyolefin polymer or copolymer having a molecular weight in the range of 500–10,000;

(III) from 5.0–20.0 weight percent of a polyalkylene glycol having a molecular weight in the range of 500–2000; and (IV) from 5.0–20.0 weight percent of a lubricating oil.

29. A concentrate composition comprising aromatic hydrocarbons and additionally comprising:

(I) from 0.1–10.0 weight percent of the reaction product obtained by reacting, at a temperature of 90° C.–150° C.:

(a) about 2 moles of a polyisobutenyl succinic acid anhydride of the formula

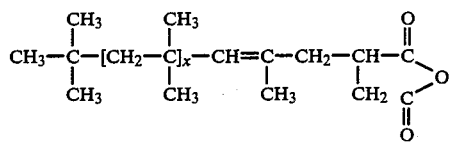

where x has a value of 20–25, and (b) about 1 mole of a polyoxyalkylene diamine of the formula

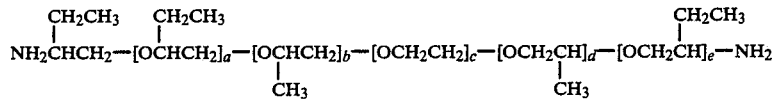

where c has a value from about 2–50, b+d has a value from about 2–50, and a+e has a value about 2–8;

(II) from 25.0–75.0 weight percent of a mixture comprising an aromatic distillate and:

(a) about 60 parts by weight of polyisobutylene ethylene diamine of the formula

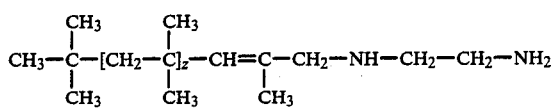

and (b) about 10–20 parts by weight of polyisobutylene of the formula

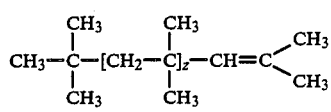

where z has a value of 30–35;

(III) from 5.0–20.0 weight percent of a polypropylene glycol having a molecular weight in the range of 750–1000; and (IV) from 5.0–20.0 weight percent of a heavy oil composition.

* * * * *